United States Patent
Kojima et al.

(10) Patent No.: US 10,173,330 B2
(45) Date of Patent: Jan. 8, 2019

(54) ROBOT ARM

(71) Applicant: KABUSHIKI KAISHA YASKAWA DENKI, Kitakyushu-shi (JP)

(72) Inventors: Kotaro Kojima, Kitakyushu (JP); Kazunori Yamamoto, Kitakyushu (JP); Tsuyoshi Ito, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 397 days.

(21) Appl. No.: 15/073,564

(22) Filed: Mar. 17, 2016

(65) Prior Publication Data
US 2017/0028567 A1 Feb. 2, 2017

Related U.S. Application Data

(60) Provisional application No. 62/198,096, filed on Jul. 28, 2015.

(51) Int. Cl.
*B25J 19/00* (2006.01)

(52) U.S. Cl.
CPC .................... *B25J 19/0062* (2013.01)

(58) Field of Classification Search
CPC ............... B25J 18/04; B25J 19/0062
USPC ............................. 74/490.01–490.1
See application file for complete search history.

(56) References Cited

U.S. PATENT DOCUMENTS

| | | | | |
|---|---|---|---|---|
| 4,496,279 A | * | 1/1985 | Langer | B25J 9/046 414/729 |
| 5,456,132 A | * | 10/1995 | Iwanaga | B25J 17/0283 74/490.06 |
| 5,816,108 A | * | 10/1998 | Obata | B25J 19/0029 74/490.05 |
| 7,628,727 B2 | * | 12/2009 | Nagai | F16H 3/005 475/291 |
| 7,841,256 B2 | * | 11/2010 | Hama | B25J 9/06 74/490.05 |
| 2013/0081503 A1 | * | 4/2013 | Long | B25J 9/102 74/490.05 |
| 2017/0028567 A1 | * | 2/2017 | Kojima | B25J 19/0062 |
| 2017/0312924 A1 | * | 11/2017 | Kinoshita | B25J 15/0009 |

FOREIGN PATENT DOCUMENTS

| | | |
|---|---|---|
| JP | 2003-181788 | 7/2003 |
| JP | 2012-161887 | 8/2012 |

OTHER PUBLICATIONS

Japanese Office Action for corresponding JP Application No. 2016-055138, dated Jan. 30, 2018 (w/ English machine translation).

* cited by examiner

*Primary Examiner* — Victor L MacArthur
(74) *Attorney, Agent, or Firm* — Mori & Ward, LLP (57) ABSTRACT

A robot arm includes a first member, a second member, an actuator, and a speed reducer. The second member is pivotable relative to the first member about a pivot axis. The actuator is configured to pivotally move the second member relative to the first member about the pivot axis. The speed reducer is configured to couple the actuator to the second member to reduce a rotational speed of the second member relative to an output rotational speed of the actuator. The speed reducer includes a grease chamber in which grease is to be provided. The second member including an air chamber in which air is provided, the air chamber being connected to the grease chamber.

10 Claims, 8 Drawing Sheets

ROBOT ARM

CROSS-REFERENCE TO RELATED APPLICATIONS

The present application claims priority to U.S. Provisional Application No. 62/198,096, filed Jul. 28, 2015, the contents of which are incorporated herein by reference in their entirety.

BACKGROUND OF THE INVENTION

Field of the Invention

The present invention relates to a robot arm.

Discussion of the Background

Robot arms have been known.

SUMMARY OF THE INVENTION

According to one aspect of the present disclosure, a robot arm includes a first member, a second member, an actuator, and a speed reducer. The second member is pivotable relative to the first member about a pivot axis. The actuator is configured to pivotally move the second member relative to the first member about the pivot axis. The speed reducer is configured to couple the actuator to the second member to reduce a rotational speed of the second member relative to an output rotational speed of the actuator. The speed reducer includes a grease chamber in which grease is to be provided. The second member including an air chamber in which air is provided, the air chamber being connected to the grease chamber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
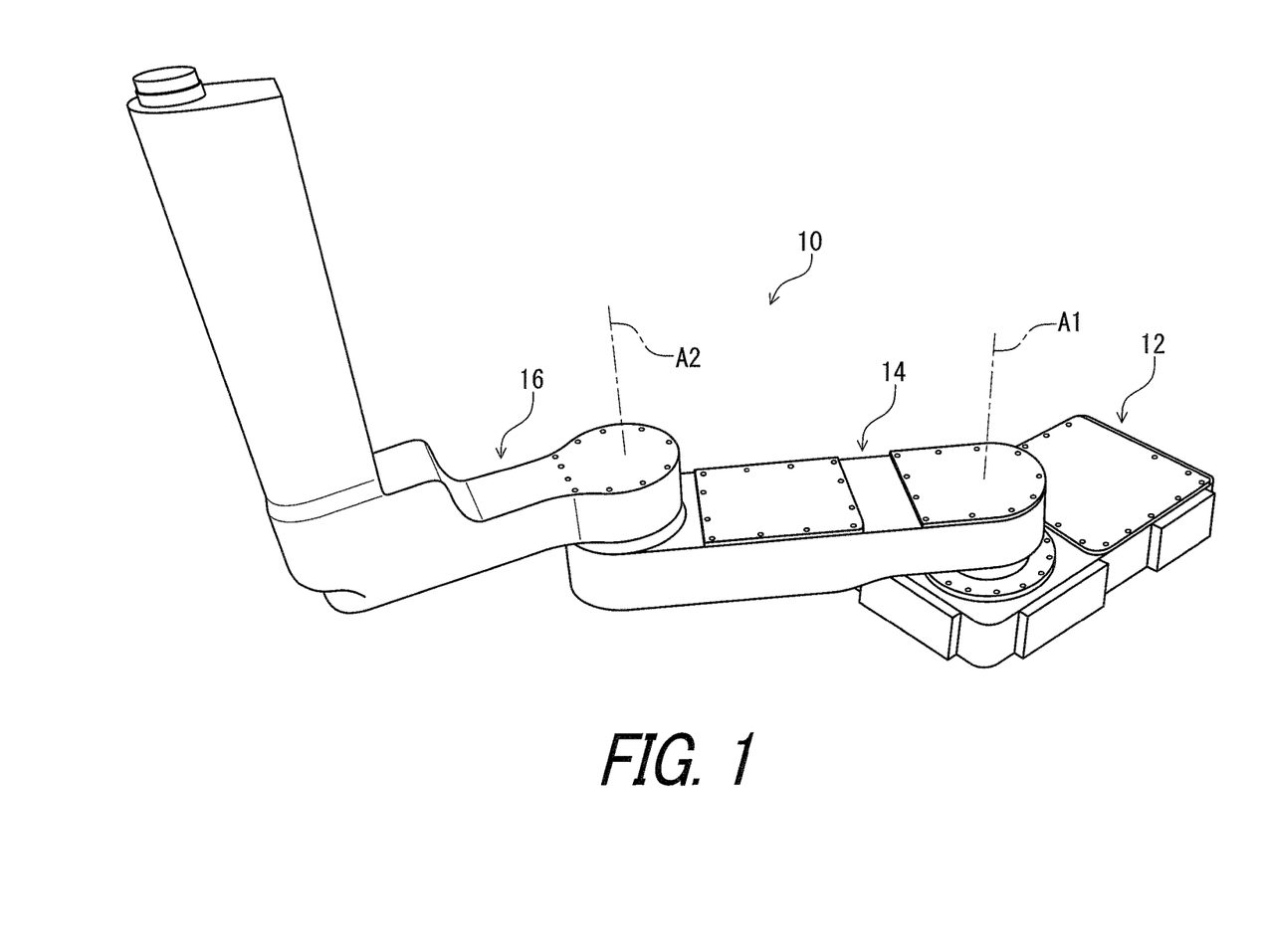
FIG. 1 is a perspective view of a robot arm in accordance with an embodiment.

Referring initially to FIG. 1, a robot arm 10 in accordance with an embodiment includes a base 12, a first arm 14, and a second arm 16. The first arm 14 is pivotable relative to the base 12 about a first pivot axis A1. The second arm 16 is pivotable relative to the first arm 14 about a second pivot axis A2. The first pivot axis A1 is substantially parallel to the second pivot axis A2. Structures of the robot arm 10 are not limited to this embodiment. In this embodiment, the base 12 can also be referred to as a first member 12, and the first arm 14 can also be referred to as a second member 14. The first pivot axis A1 can also be referred to as a pivot axis A1.

Figure 2:
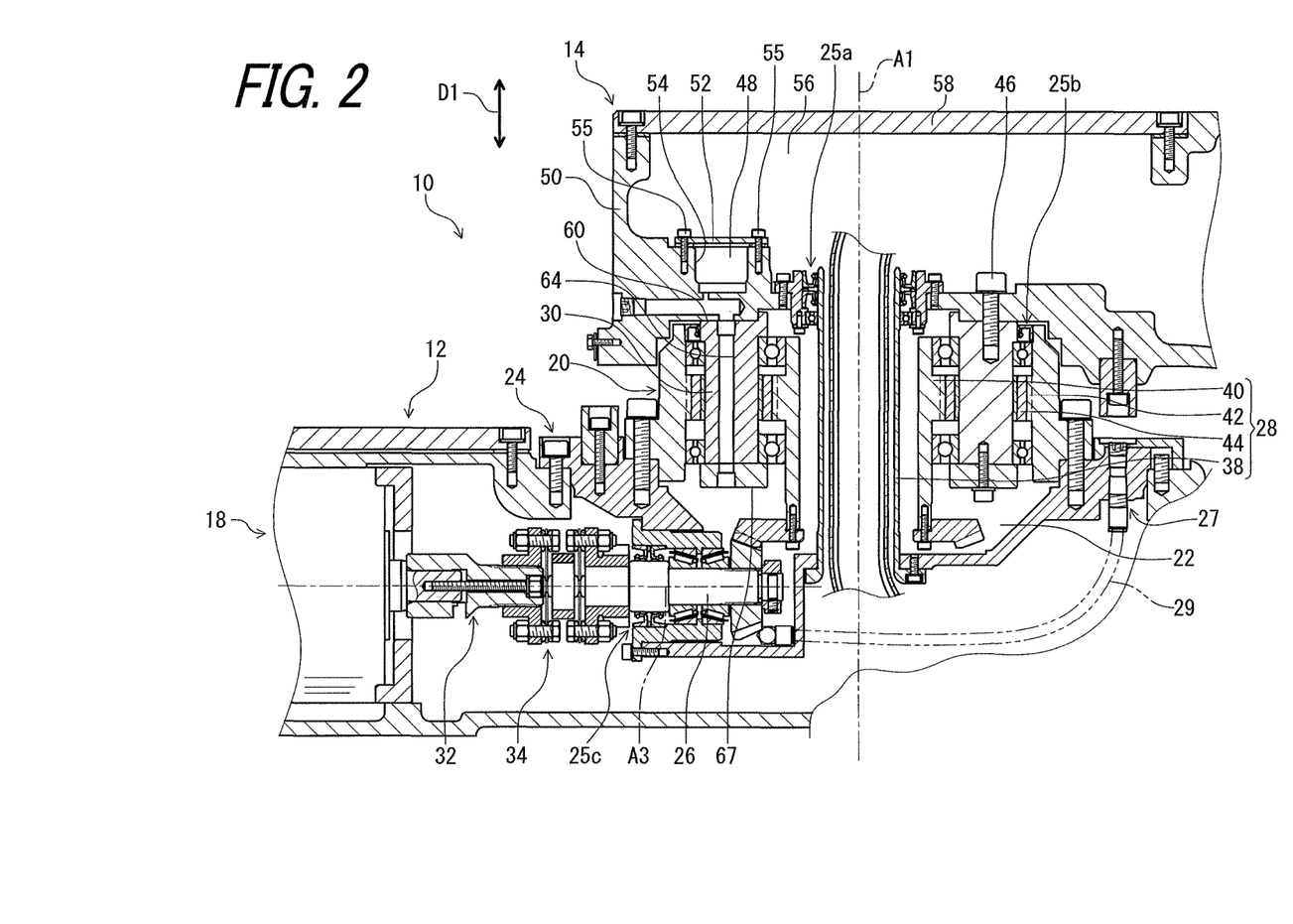
FIG. 2 is a partial cross-sectional view of the robot arm.

As seen in FIG. 2, the robot arm 10 includes the first member 12, the second member 14, an actuator 18, and a speed reducer 20. The second member 14 is pivotable relative to the first member 12 about the pivot axis A1. The actuator 18 is configured to pivotally move the second member 14 relative to the first member 12 about the pivot axis A1. Examples of the actuator 18 include a motor.

The speed reducer 20 is configured to couple the actuator 18 to the second member 14 to reduce a rotational speed of the second member 14 relative to an output rotational speed of the actuator 18. The speed reducer 20 includes a grease chamber 22 in which grease is to be provided. In this embodiment, the speed reducer 20 includes a housing 24, an input member 26, a reducing structure 28, and an output member 30. The housing 24 is secured to the first member 12 and defines the grease chamber 22. Specifically, the robot arm 10 includes seal members 25a, 25b, and 25c. The grease chamber 22 is defined by the housing 24 and the seal members 25a, 25b, and 25c. The housing 24 includes an inlet port 27 from which grease is supplied to the grease chamber 22. The robot arm 10 includes a connecting hose 29 connecting the inlet port 27 to the grease chamber 22.

The input member 26 is rotatable relative to the first member 12, the second member 14, the housing 24, and the output member 30 about a rotational axis A3. The input member 26 is rotatably mounted to the housing 24. The input member 26 substantially horizontally extends in the usage state of the robot arm 10. The actuator 18 includes an output shaft 32 rotatable relative to the first member 12 about the rotational axis A3. The input member 26 is coupled to the output shaft 32 of the actuator 18 via a coupling structure 34.

The reducing structure 28 includes a planetary gear structure 36, for example. The reducing structure 28 is provided in the housing 24 to couple the input member 26 to the output member 30. In this embodiment, the planetary gear structure 36 includes a rotational shaft 38, a sun gear 40, a ring gear 42, and planetary gears 44. The rotational shaft 38 is rotatably mounted to the housing 24 about the pivot axis A1. The sun gear 40 is secured to the rotational shaft 38. The ring gear 42 is secured to the housing 24. The planetary gears 44 are provided between the sun gear 40 and the ring gear 42 to be engaged with the sun gear 40 and the ring gear 42. The output member 30 couples the planetary gears 44. The speed reducer 20 can have other structures different from the reducing structure 28. For example, the speed reducer 20 can include a cyclo-speed reducer.

The output member 30 is coupled to the second member 14. The output member 30 is rotatably mounted to the housing 24 and extends in an axial direction D1 parallel to the pivot axis A1. The output member 30 is secured to the second member 14 with fasteners 46 such as bolts.

The second member 14 including an air chamber 48 in which air is provided. The air chamber 48 is connected to the grease chamber 22. The air chamber 48 is provided above the grease chamber 22 in a usage state of the robot arm 10. In the usage state of the robot arm 10, the pivot axis A1 vertically extends, and the second member 14 is provided above the first member 12.

The second member 14 includes a second body 50 and a lid 52. The second body 50 includes a recess 54. The recess 54 is integrally provided with the second body 50 as a one-piece unitary member. The lid 52 is attached to the second body 50 to cover the recess 54. The air chamber 48 is defined by the recess 54 and the lid 52. In this embodiment, the lid 52 is secured to the second body 50 with fasteners 55 such as bolts.

The second body 50 includes an internal space 56. The lid 52 is provided in the internal space 56. Specifically, the second member 14 includes a cover plate 58 attached to the second body 50. The internal space 56 is defined by the second body 50 and the cover plate 58. The lid 52 is not exposed from the second member 14 in a state where the cover plate 58 is attached to the second body 50. However, the lid 52 can be provided at a position where the lid 52 is exposed from the second member 14 in the state where the cover plate 58 is attached to the second body 50.

Figure 3:
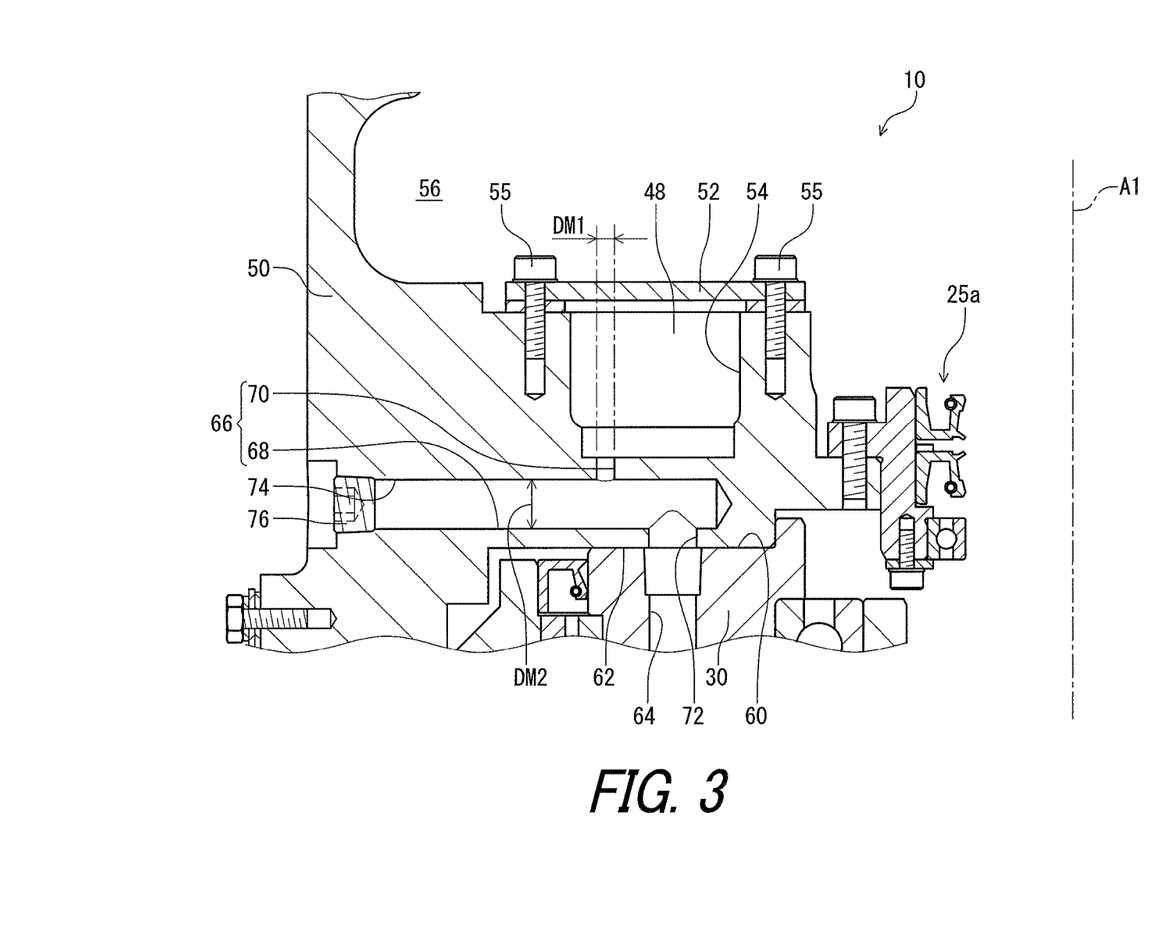
FIG. 3 is a partial enlarged cross-sectional view of the robot arm.

As seen in FIG. 3, the air chamber 48 is provided above the output member 30 in the usage state of the robot arm 10. Specifically, the output member 30 includes a first surface 60. The second member 14 includes a second surface 62 facing the first surface 60. The air chamber 48 is provided above the second surface 62 in the usage state of the robot arm 10. For example, a sealing material such as a caulking material is provided between the first surface 60 and the second surface 62.

The output member 30 includes a first passageway 64 connected to the grease chamber 22. The second member 14 includes a second passageway 66 connecting the air chamber 48 to the first passageway 64. In this embodiment, the first passageway 64 extends in the axial direction D1. As seen in FIG. 2, the first passageway 64 extends from the first surface 60 to a lower surface 67 through the output member 30 in the axial direction D1. A lower end opening of the first passageway 64 is in communication with the grease chamber 22.

As seen in FIG. 3, the second passageway 66 includes a bleed passageway 68 and an intermediate passageway 70. The bleed passageway 68 is configured to connect the first passageway 64 to outside of the second member 14. The intermediate passageway 70 connects the bleed passageway 68 to the air chamber 48. The bleed passageway 68 substantially radially extends relative to the pivot axis A1. The bleed passageway 68 substantially horizontally extends in the usage state of the robot arm 10. The intermediate passageway 70 extends in the axial direction D1.

The bleed passageway 68 includes a first end opening 72 and a second end opening 74. The first end opening 72 is connected to the first passageway 64. The second end opening 74 is closed with a plug 76. The plug 76 is detachably attached to the second end opening 74. The first end opening 72 is closer to the pivot axis A1 than the second end opening 74. The intermediate passageway 70 is provided between the first end opening 72 and the second end opening 74. However, the first end opening 72 can be provided between the intermediate passageway 70 and the second end opening 74.

The intermediate passageway 70 has a maximum cross-sectional area smaller than a minimum cross-sectional area of the bleed passageway 68. In this embodiment, each of the bleed passageway 68 and the intermediate passageway 70 has a circular cross section. The intermediate passageway 70 has an inner diameter DM1 smaller than an inner diameter DM2 of the bleed passageway 68. However, the inner diameter DM1 can be equal to or larger than the inner diameter DM2.

Figure 4:
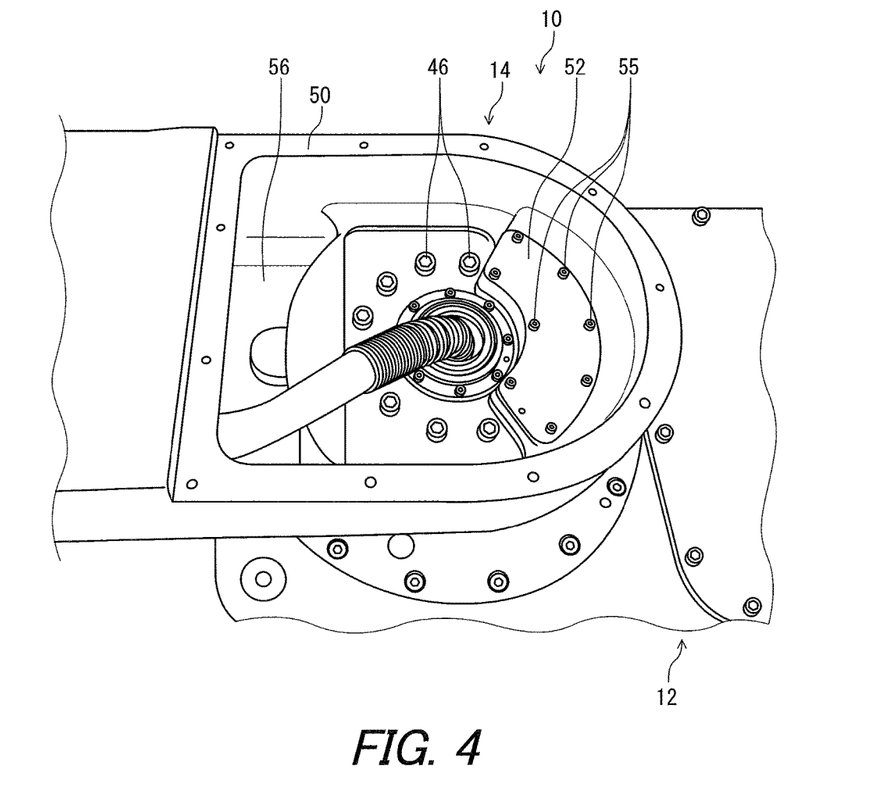
FIG. 4 is a perspective view of the robot arm with a cover plate omitted.
Figure 5:
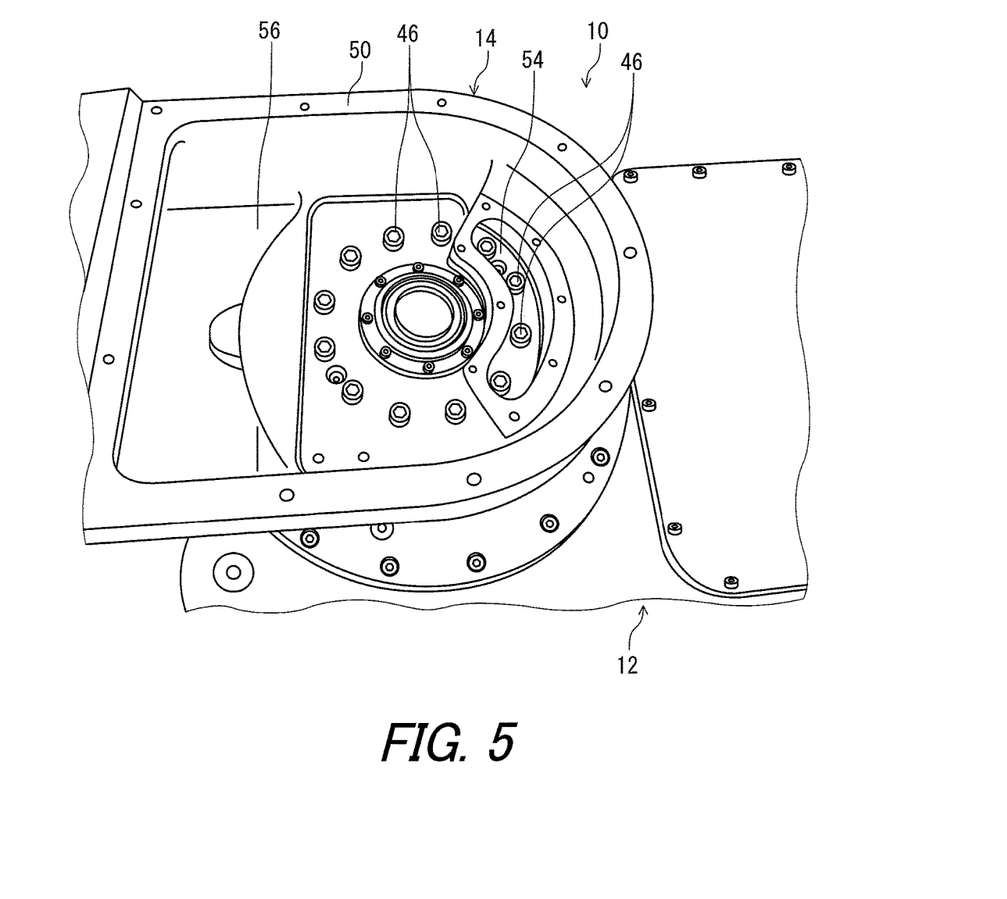
FIG. 5 is a perspective view of the robot arm with the cover plate and a lid omitted.

As seen in FIGS. 4 and 5, the air chamber 48 has a curved shape when viewed from the axial direction D1 parallel to the pivot axis A1. In this embodiment, each of the recess 54 and the lid 52 has a curved shape when viewed from the axial direction D1 parallel to the pivot axis A1. The air chamber 48 (e.g., the recess 54 and the lid 52) extends in a rotational direction in which the second member 14 pivots about the pivot axis A1 relative to the first member 12. The lid 52 is accessible from outside of the robot arm 10 in a state where the cover plate 58 is removed from the second member 14.

Figure 6:
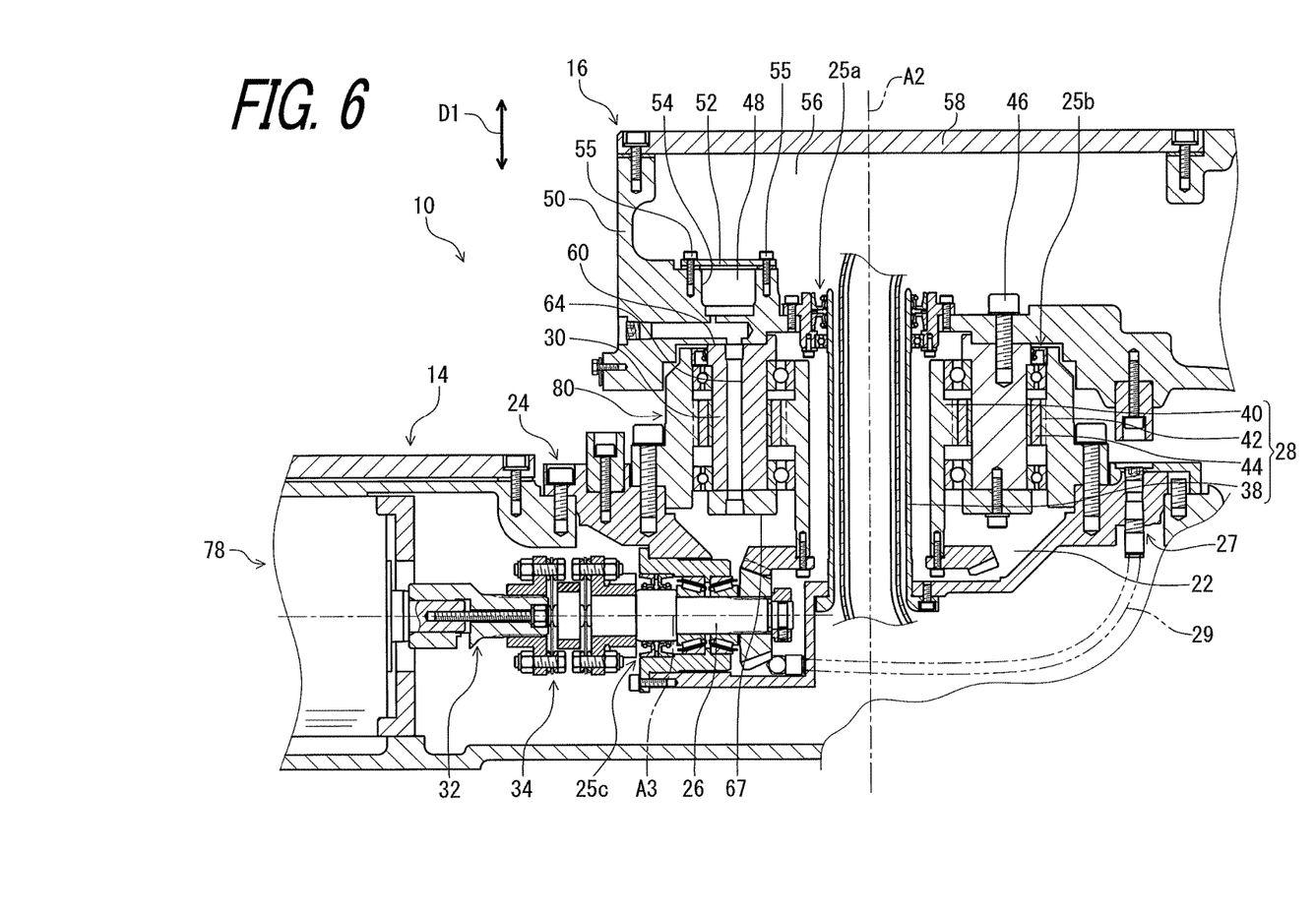
FIG. 6 is a partial cross-sectional view of the robot arm.
Figure 7:
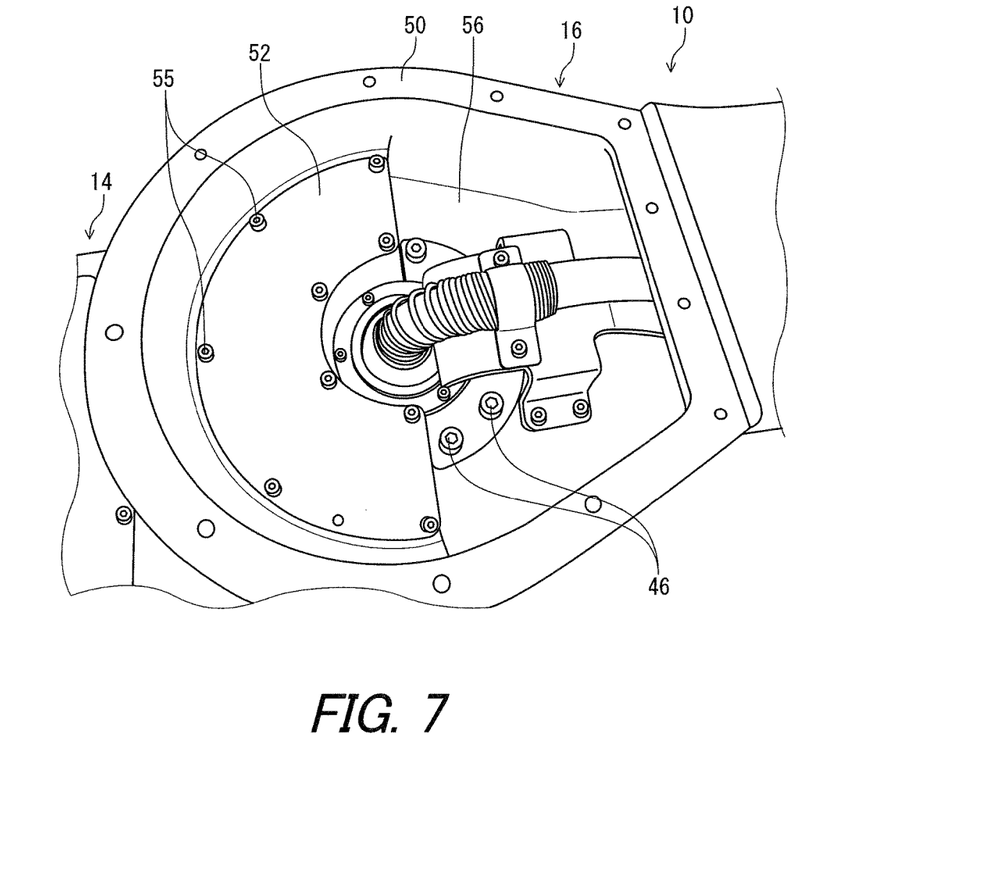
FIG. 7 is a perspective view of the robot arm with a cover plate omitted.
Figure 8:
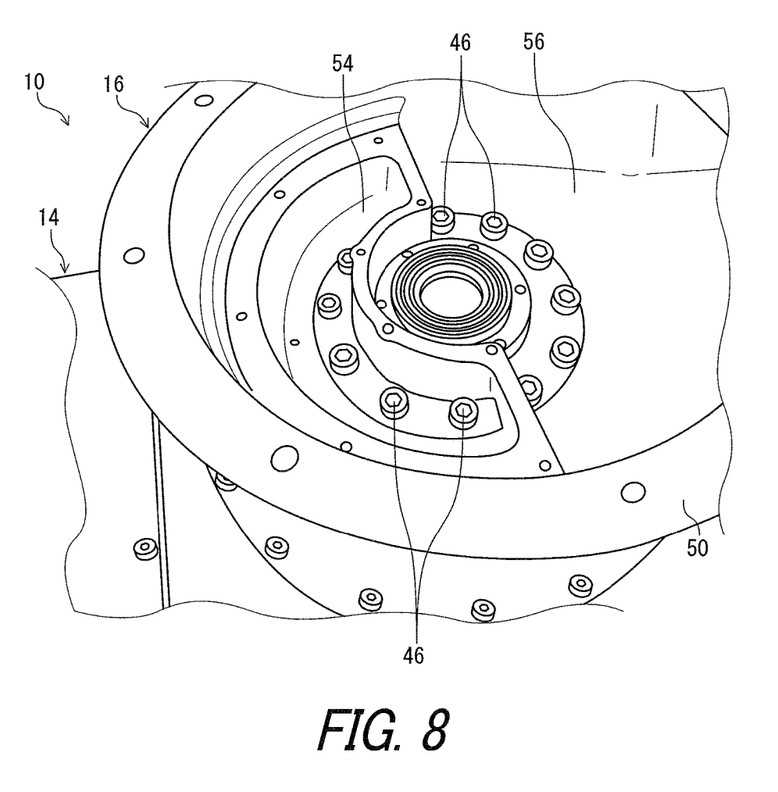
FIG. 8 is a perspective view of the robot arm with the cover plate and a lid omitted.

As seen in FIGS. 6 to 8, the robot arm 10 includes an actuator 78 and a speed reducer 80. The actuator 78 has substantially the same structure as that of the actuator 18. The speed reducer 80 has substantially the same structure as that of the speed reducer 20. Furthermore, a structural relationship between the first arm 14 (a first member 14) and the second arm 16 (a second member 16) is substantially the same as a structural relationship between the base 12 (the first member 12) and the first arm 14 (the second member 14). Thus, it is possible to use the above description relating to the first member 12, the second member 14, the actuator 18, and the speed reducer 20 by replacing these elements with the first member 14, the second member 16, the actuator 78, and the speed reducer 80. Thus, elements having substantially the same function as those in the base 12, the first arm 14, the actuator 18, and the speed reducer 20 will be numbered the same here, and they will be not described and/or illustrated in detail here for the sake of brevity.

With the robot arm 10, it is possible to obtain the following effects.

(1) When grease and/or air provided in the grease chamber 22 varies due to environmental change such as change in a temperature, an inner pressure changes in the grease chamber 22. In the robot arm 10, however, the air chamber 48 is connected to the grease chamber 22. Accordingly, the change in the inner pressure of the grease chamber 22 can be absorbed by the air chamber 48. Furthermore, since the second member 14 includes the air chamber 48, it is possible to utilize a part of the second member 14 as the air chamber 48. Thus, it is possible to absorb the change in the inner pressure of the grease chamber 22 with controlling or preventing upsizing of the robot arm 10 compared with a robot arm including an air chamber provided in the first member (e.g., the base 12).

(2) Since the air chamber 48 is provided above the grease chamber 22 in the usage state of the robot arm 10, it is possible to restrict the grease from flowing to the air chamber 48.

(3) Since the air chamber 48 is provided above the output member 30 in the usage state of the robot arm 10, it is possible to effectively restrict the grease from flowing to the air chamber 48.

(4) Since the air chamber 48 is provided above the second surface 62 of the second member 14 in the usage state of the robot arm 10, it is possible to more effectively restrict the grease from flowing to the air chamber 48.

(5) The output member 30 includes the first passageway 64 connected to the grease chamber 22, and the second member 14 includes the second passageway 66 connecting the air chamber 48 to the first passageway 64. Accordingly, it is possible to conduct the expanded air from the grease chamber 22 of the speed reducer 20 to the air chamber 48 of the second member 14 via the first passageway 64 and the second passageway 66.

(6) Since the second passageway 66 includes the bleed passageway 68 and the intermediate passageway 70, it is possible to bleed extra grease from the grease chamber 22 via the bleed passageway 68.

(7) Since the intermediate passageway 70 has the maximum cross-sectional area smaller than the minimum cross-sectional area of the bleed passageway 68, it is possible to more effectively restrict the grease from flowing to the air chamber 48.

(8) Since the air chamber 48 is defined by the recess 54 and the lid 52 of the second member 14, it is possible to simplify the structure of the air chamber 48. Furthermore, it is possible to easily seal the air chamber 48.

(9) Since the lid 52 is provided in the internal space 56, it is possible to utilize the internal space 56 of the second body 50.

(10) Since the recess 54 is integrally provided with the second body 50 as a one-piece unitary member, it is possible to simplify the structure of the second body 50. Accordingly, it is possible to control increase in cost caused by providing the recess 54.

(11) Since the air chamber 48 has the curved shape when viewed from the axial direction D1, it is possible to effectively utilize a part of the second member 14 as the air chamber 48.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A robot arm comprising:
    a first member;
    a second member pivotable relative to the first member about a pivot axis;
    an actuator configured to pivotally move the second member relative to the first member about the pivot axis;
    a speed reducer configured to couple the actuator to the second member to reduce a rotational speed of the second member relative to an output rotational speed of the actuator, the speed reducer including a grease chamber in which grease is to be provided, the speed reducer including an output member coupled to the second member, the output member including a first passageway connected to the grease chamber; and
    the second member including an air chamber in which air is provided, the air chamber being connected to the grease chamber, the second member including a second passageway connecting the air chamber to the first passageway.

2. The robot arm according to claim 1, wherein
the air chamber is provided above the grease chamber in a usage state of the robot arm.

3. The robot arm according to claim 1, wherein
the air chamber is provided above the output member in a usage state of the robot arm.

4. The robot arm according to claim 3, wherein
the output member includes a first surface,
the second member includes a second surface facing the first surface, and
the air chamber is provided above the second surface in the usage state of the robot arm.

5. The robot arm according to claim 1, wherein
the second passageway includes
    a bleed passageway configured to connect the first passageway to outside of the second member, and
    an intermediate passageway connecting the bleed passageway to the air chamber.

6. The robot arm according to claim 5, wherein
the intermediate passageway has a maximum cross-sectional area smaller than a minimum cross-sectional area of the bleed passageway.

7. The robot arm according to claim 1, wherein
the second member includes
    a second body including a recess, and
    a lid attached to the second body to cover the recess, and
the air chamber is defined by the recess and the lid.

8. The robot arm according to claim 7, wherein
the second body includes an internal space, and
the lid is provided in the internal space.

9. The robot arm according to claim 7, wherein
the recess is integrally provided with the second body as a one-piece unitary member.

10. The robot arm according to claim 1, wherein
the air chamber has a curved shape when viewed from an axial direction parallel to the pivot axis.

* * * * *